(12) United States Patent
Sarkar et al.

(10) Patent No.: US 8,245,521 B2
(45) Date of Patent: Aug. 21, 2012

(54) PROCESS AND APPARATUS FOR CONCENTRATING DILUTE SOLUTION

(75) Inventors: Manoj Kumar Sarkar, Hyderabad (IN);
Binay Kumar Giri, Hyderabad (IN);
Banibrata Pandey, Hyderabad (IN)

(73) Assignee: Nagarjuna Energy Private Limited, Hyderabad (IN)

( * ) Notice: Subject to any disclaimer, the term of this patent is extended or adjusted under 35 U.S.C. 154(b) by 438 days.

(21) Appl. No.: 12/532,946

(22) PCT Filed: Jun. 19, 2008

(86) PCT No.: PCT/IB2008/001606
§ 371 (c)(1),
(2), (4) Date: Nov. 17, 2009

(87) PCT Pub. No.: WO2008/155640
PCT Pub. Date: Dec. 24, 2008

(65) Prior Publication Data
US 2010/0126193 A1    May 27, 2010

(30) Foreign Application Priority Data
Jun. 20, 2007    (IN) .......................... 2379/CHE/2006

(51) Int. Cl.
*F25B 1/00*    (2006.01)

(52) U.S. Cl. ............................................. 62/115; 62/123
(58) Field of Classification Search ................. 62/115, 62/12, 532, 542, 629, 644, 646, 648
See application file for complete search history.

(56) References Cited

U.S. PATENT DOCUMENTS

| | | | |
|---|---|---|---|
| 4,112,702 A | | 9/1978 | Smirnov et al. |
| 4,188,797 A | * | 2/1980 | Thijssen et al. ................ 62/123 |
| 4,332,140 A | | 6/1982 | Thijssen et al. |
| 4,666,456 A | | 5/1987 | Thijssen et al. |
| 4,717,408 A | * | 1/1988 | Hopewell ........................ 62/633 |
| 4,735,781 A | * | 4/1988 | Thijssen et al. ............... 422/251 |
| 4,830,645 A | * | 5/1989 | Ghodsizadeh et al. .......... 62/541 |
| 4,885,016 A | | 12/1989 | Griffiths |
| 5,120,338 A | * | 6/1992 | Potts et al. ...................... 62/629 |
| 5,127,921 A | | 7/1992 | Griffiths |
| 5,363,660 A | * | 11/1994 | Li et al. ............................. 62/71 |
| 5,564,289 A | * | 10/1996 | Hino .................................. 62/534 |
| 5,666,819 A | * | 9/1997 | Rockenfeller et al. .......... 62/480 |
| 5,700,435 A | * | 12/1997 | Bischof ....................... 422/245.1 |
| 6,305,178 B1 | * | 10/2001 | Shi et al. ......................... 62/123 |
| 6,515,187 B1 | * | 2/2003 | Schon et al. ................... 568/492 |

* cited by examiner

*Primary Examiner* — Mohammad Ali
(74) *Attorney, Agent, or Firm* — Weingarten, Schurgin, Gagnebin & Lebovici LLP

(57) ABSTRACT

The present invention provides a process and an apparatus for concentrating dilute solution.

8 Claims, 3 Drawing Sheets

Schematic diagram of fractional freeze column with external attachments

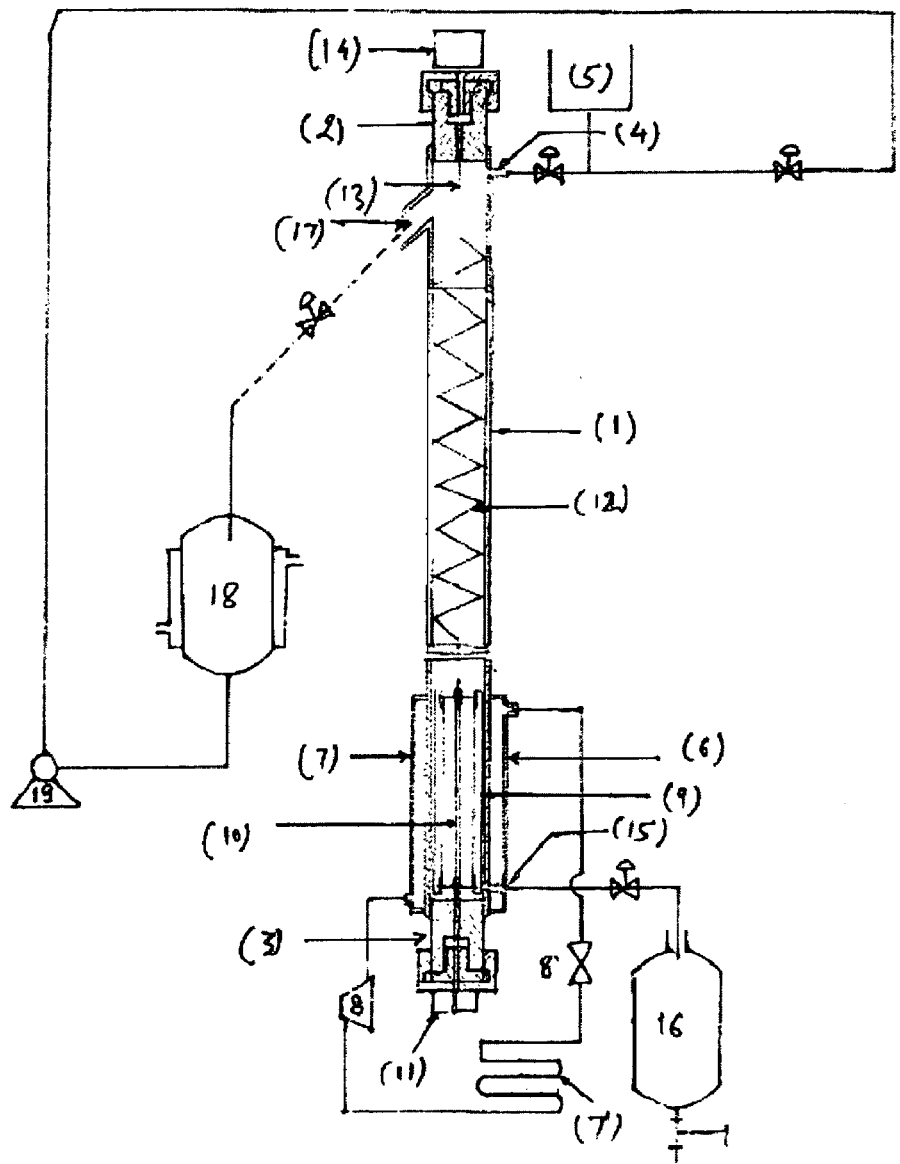
Fig.1: Schematic diagram of fractional freeze column with external attachments

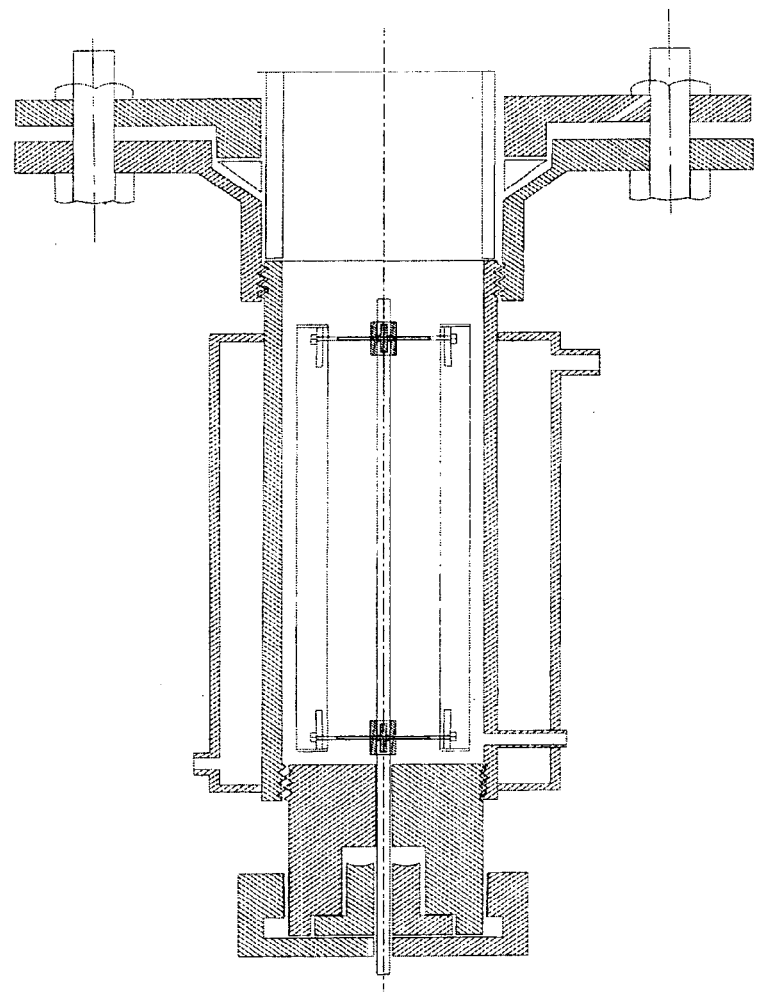
Figure: 2 shows the section of freezing concentration column where the step 1 is happened. This portion consist jacket for circulation of refrigerant, and scraper which help for scraping of ice.

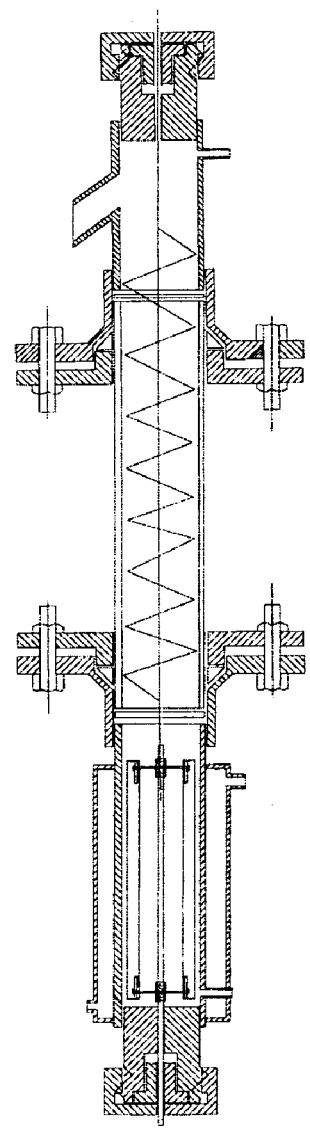
Figure 3: illustrates the complete fractional freezing column without external attachments

PROCESS AND APPARATUS FOR CONCENTRATING DILUTE SOLUTION

FIELD OF INVENTION

The present invention relates to a process and apparatus for concentrating dilute solution, particularly, the present invention relates to a process for concentrating dilute solution by multistage fractional freezing.

BACKGROUND OF THE INVENTION

Concentration of aqueous solutions is a common process in many industries. The technique widely used for the concentration of aqueous solutions is evaporation. However, an efficient evaporation process must be performed under boiling conditions at higher temperatures, which may result in loss and/or damage of certain volatile or heat-sensitive materials in the solutions. Instead of turning water into steam, fractional freezing is a process by crystallizing water in ice at temperatures below freezing point of the solutions, hence, making aqueous solutions concentrated. Purpose of fractional freezing has been to obtain concentrated solutions, which may include colloidal solution, true solution and or mixture of solution, purified water etc. Fractional freezing has many advantages over evaporation because of the lower process temperature. At a lower temperature flavors, aromas, nutrients and other valuable components in the original materials can be kept without loss. Moreover, at a lower temperature, destruction of heat-sensitive substances can be avoided. Therefore, with fractional freezing extremely high quality products can be obtained. The fractional freezing process can be applied for concentrating food, beverage, dairy, biochemical, nutriceutical, pharmaceutical, chemical, and environmental industries.

Theoretically, the latent heat of sublimation from water to ice is about 80 kcal/kg and is only one seventh of that from water to steam about 540 kcal/kg. So the process of fractional freezing there is a great potential to save energy for concentrating aqueous solutions. Freeze concentration contains steps of refrigeration of solution, crystallization of ice and separation of ice crystals from the mother liquid. To make a freeze concentration technique commercially feasible, aqueous solutions must be efficiently and economically refrigerated and large, uniform ice crystals, which are easily separated from the solution, must be efficiently obtained. However, ice crystallization is a complex phase transition and control of ice crystallization is very difficult due to the complexity. Therefore, the major difficulties for freeze concentration are in two interrelated aspects. Firstly, it is hard to separate ice crystals from the concentrated solution because of small size of ice crystals obtained. Secondly, process of obtaining large ice crystals proceeds slowly and the efficiency is low.

U.S. Pat. No. 4,666,456 relates to a process for fractional freezing, which includes continuous partial crystallization of a compound from a liquid mixture in which the mixture fed through a cascade of a plurality of cooling sections. These cooling sections connected in series, and the temperature of each subsequent one of the cascading cooling sections is lower than that of the preceding one. U.S. Pat. No. 4,885,016 described method and apparatus for superpurifying crystallizable substances by a multistage recrystallization procedure, which includes measures to control reflux ratio conditions by providing metering procedures that control quantities of crystals and mother liquor reflux materials that are transferred according to the method, and apparatus. In each stage, a crystallizable substance is frozen and recrystallized, and the crystals separated from the mother liquor. U.S. Pat. No. 5,127,921 discloses method and apparatus for superpurifying crystallizable substances by a multi-stage recrystallization procedure which includes measures to control reflux ratio conditions by providing metering procedures that control quantities of crystals and mother liquor reflux materials that are transferred according to the method and apparatus. U.S. Pat. No. 4,112,702 discloses freeze desalination and concentration through heat exchanger and refrigeration. U.S. Pat. No. 4,332,140 tells about an apparatus for the continuous operation of concentrating aqueous solution through counter current crystallizer.

To the best of the Applicant's knowledge there is no process available for concentrating the dilute solution in a single fractionation column.

OBJECTS OF THE INVENTION

The main object of the present invention is to provide a process for concentrating dilute solution using a single column utilizing minimum energy.

Another object of the present invention is to provide an apparatus concentrating diluted solution in one single fractionating column.

One more object of the present invention is to develop a continuous process for concentrating diluted solution.

SUMMARY OF INVENTION

The present invention overcomes the limitations of the prior art by effective ice scraping, by separation of the ice crystal. The present invention, as shown in FIG. 1 relates to a physical process to concentrate any aqueous solution by fractional freezing and separating water from the solution. The purpose of the process is to obtain high quality concentrated aqueous solutions for energy utilization and thereby reducing the capital cost for operating the system economically.

In the present invention, a technique of developing tiny ice crystal, which can be separated from the mother solution by operating a device to affect the process of fractional freezing in a single column.

Operation for the process described in the present invention is an arrangement for a continuous, multistage fractional freezing in a single column.

STATEMENT OF INVENTION

Accordingly, the present invention relates to a process for concentrating dilute solution, said process comprising:
(a) Supplying dilute solution to be concentrated in a vertical freeze concentration column so that dilute solution travels in the downward direction toward a lower end of the freeze concentration column;
(b) Producing localized freezing and micro-size ice particles near the lower end of the freeze concentration column so that the ice particles travels towards upper end of the freeze concentration column;
(c) Collecting ice particles near the upper end of the freeze concentration column;
(d) Melting ice particles collected in step (c) and subsequently re-circulating part of the liquid to the freeze concentration column so that the said liquid travels towards the lower end of the freeze concentration column;
(e) Repeating the steps (a) to (d) for fractionating dissolved solid concentrate and aqueous solution near the upper and lower end of the freeze concentration column respectively till the desired concentration of the dissolved solid is achieved;
(f) Obtaining the concentrate from the lower end of the freeze concentration column.

The present invention also relates to an apparatus for concentrating dilute solution, said apparatus comprising:
(a) a freeze concentration column placed vertically having an upper end and a lower end; said freeze concentration column having an inlet for supplying the dilute solution to be concentrated; the inlet is located on the freeze concentration column so that the dilute solution travels in downward direction toward the lower end of the freeze concentration column;
(b) a refrigerating unit connected to the freeze concentration column so as to generate localized freezing near the lower end of the freeze concentration column;
(c) a means for generating micro-size ice particles placed at the area of localized freezing;
(d) a first receiver coupled to a first outlet of the freeze concentration column for collecting concentrated solution; said first outlet is located near the lower end of the reactor chamber;
(e) a second receiver coupled to a second outlet of the freeze concentration column for collecting the micro-size ice particles; said second outlet is located near the upper end of the freeze concentration column.

BRIEF DESCRIPTION OF FIGURES

FIG. 1 is an exemplary illustration of an apparatus for concentrating dilute solution according to the present invention.

FIG. 2 shows sectional view of the fractional freeze column according to the present invention.

FIG. 3 illustrates fractional freeze column according to the present invention without external attachments.

DETAILED DESCRIPTION OF THE PRESENT INVENTION

Accordingly, the present invention provides a process for concentrating dilute solution, said process comprising:
(a) Supplying dilute solution to be concentrated in a vertical freeze concentration column so that dilute solution travels in the downward direction toward a lower end of the freeze concentration column;
(b) Producing localized freezing and micro-size ice particles near the lower end of the freeze concentration column so that the ice particles travels towards upper end of the freeze concentration column;
(c) Collecting ice particles near the upper end of the freeze concentration column;
(d) Melting ice particles collected in step (c) and subsequently re-circulating part of the liquid to the freeze concentration column so that the said liquid travels towards the lower end of the freeze concentration column;
(e) Repeating the steps (a) to (d) for fractionating dissolved solid concentrate and aqueous solution near the upper and lower end of the freeze concentration column respectively till the desired concentration of the dissolved solid is achieved;
(f) Obtaining the concentrate from the lower end of the freeze concentration column.

The present invention also provides an apparatus for concentrating dilute solution, said apparatus comprising:

(a) a freeze concentration column placed vertically having an upper end and a lower end; said freeze concentration column having an inlet for supplying the dilute solution to be concentrated; the inlet is located on the freeze concentration column so that the dilute solution travels in downward direction toward the lower end of the freeze concentration column;
(b) a refrigerating unit connected to the freeze concentration column so as to generate localized freezing near the lower end of the freeze concentration column;
(c) a means for generating micro-size ice particles placed at the area of localized freezing;
(d) a first receiver coupled to a first outlet of the freeze concentration column for collecting concentrated solution; said first outlet is located near the lower end of the reactor chamber;
(e) a second receiver coupled to a second outlet of the freeze concentration column for collecting the micro-size ice particles; said second outlet is located near the upper end of the freeze concentration column.

In an embodiment of the present invention, the means for generating micro-size ice particles is scrapper or a sperger.

In another embodiment of the present invention, the freeze concentration column is provided with a means for facilitating movement of ice particles toward upper end of the freeze concentration column.

In still another embodiment of the present invention, the means for facilitating movement of ice particles is a screw type conveyor or a perforated screw.

In yet another embodiment of the present invention the inlet of the freeze concentration column coupled with the second receiver for supplying part of the liquid from second receiver to the freeze concentration column.

In one more embodiment of the present invention the scrapper comprises blades mounted on a shaft which rotatable by a motor.

Fractional freezing is a physical process for concentrating aqueous solution into concentrated solution by continuously removing the water portion of the aqueous solution in form of tiny ice particles.

For certain aqueous solutions with higher concentration, the rate of ice nucleation is greatly reduced due to the high viscosity of the solutions and therefore the movement of the formed tiny ice restricted and slowed down the process whereas, this invention of fractional freezing higher concentration of aqueous solution possible due to the process utilizes slowly released micro-sized ice particles before the ice particles joined together to form large conglomerate.

Accordingly, in the process of the present invention, dilute solution supplied in the freeze concentration column. The solution travels in the downward direction toward a lower end of the vertical column. Therefore, the dilute solution can be supplied in the freeze concentration column at a location above the lower end. In other words, the dilute solution can be supplied from the upper end or from any intermediate location between the upper end and the lower end. Accordingly, an inlet can be provided on the freeze concentration column.

In the process of the present invention, localized freezing produced near the lower end of the column, which leads to the concentration of the dilute solution. At the location of freezing micro-sized ice particles are generated. Due to the density difference, these micro-sized ice particles travel in upward direction towards the upper end of the freeze concentration column.

The ice particles while traveling in upward direction transfers dissolved solid to the diluted solution. Ice particles and the dilute solution form a system, which has a tendency to attain the equilibrium. The mass transfer i.e. transfer of dissolved solid occurs due to the concentration and temperature difference between the ice particles and the dilute solution. Therefore, in order to attain equilibrium the mass transfer or transfer of dissolved solid occurs from the ice particle to the dilute solution takes place. This leads to further concentration of dilute solution. Smaller the size of the ice particles, higher will be the surface area and hence larger will be the mass transfer.

The ice particles collected near the upper end of the freeze concentration column. Ice particles collected from the freeze concentration column melted and the part of liquid thus obtained can be re-circulated in the freeze concentration column.

Above steps can be repeated for fractionating dissolved solid concentrate and aqueous solution near the upper and lower end of the freeze concentration column respectively till the desired concentration of the dissolved solid is achieved.

Concentrated solution obtained by the above process of the present invention can be collected from the lower end of the freeze concentration column.

As can be observed from the above description, the process of the present invention is a continuous and multistage freezing process in a single column.

Accordingly, the present invention provides an apparatus for concentrating the dilute solution according to the present invention. The apparatus for concentrating the dilute solution comprises a freeze concentration column which is vertically placed. The freeze concentration column has an upper end and a lower end. An inlet is provided on the freeze concentration column for supplying the dilute solution which is to be concentrated. Since in the process of the present invention, the dilute solution is to be supplied so that it travels in the downward direction towards the lower end of the column. Therefore, the inlet can be provided at or near the upper end or any intermediate location between upper and lower end of the freeze concentration column.

A refrigerating unit is provided to the freeze concentration column near the lower end of the column for generating localized freezing. The refrigerating unit freezes the dilute solution to be concentrated. The ice formed by the refrigerating unit is converted in to small or even micro-sized ice particles. A scrapper, a sperger or any other suitable means can be provided to the freeze concentration column for generating micro-sized particle. A scrapper having blade type configuration can be a suitable means for generating micro-sized ice particles. The scrapper can be mounted on a shaft which is rotatable with the help of a motor. As it can be clearly understood that the there should be a gap between the scrapper blades and wall of the freeze concentration column and the scrapper should be in a moving condition to avoid jamming of the scrapper.

An outlet is provided on the freeze concentration column for collecting concentrated solution. A receiver can be coupled to the said outlet for collecting the concentrated solution.

Small or micro-sized ice particles formed near the lower end travel in upward direction towards the upper end of the concentration column. While the ice particles move upward in the column there is a mass transfer of dissolved solid takes place from the ice particles into dilute solution. This leads to further increase in the concentration of the dilute solution.

Ice particles can be collected back from a second outlet provided near the upper end of the freeze concentration column. The outlet from which the concentrated solution is collected can be considered as first outlet. A second receiver can be coupled to the second outlet for collecting the ice particles. The receiver in which the concentrated solution is collected can be considered as first receiver.

Ice particles collected in the second receiver is melted and part of the melted ice can be re-circulated in the freeze concentration column.

According to an embodiment of the present invention, a means for facilitating the movement can be provided so that the ice particles move slowly in upward direction for effective mass transfer of dissolved solid from ice particles to dilute solution. The means for facilitating the movement can be a screw type conveyor or a perforated screw or small gas bubbles flowing upwards.

As can be clearly understood from the above description that in the apparatus of the present invention multistage freeze concentration is achieved in a single column.

Following paragraphs describes the present invention with reference to the figures according to an embodiment of the present invention. This should not be construed in a limiting sense.

FIG. 1 is an exemplary illustration of the apparatus for concentrating dilute solution according town embodiment of the present invention. As can be noticed from FIG. 1, the apparatus for concentrating dilute solution has a vertically placed freeze concentration column (1). The freeze concentration column (1) has an upper end (2) and a lower end (3). The freeze concentration column (1) has an inlet (4) for supplying dilute solution which is to be concentrated. FIG. 1 shows that the inlet (4) provided near the upper end (2) of the freeze concentration column (1). However, the inlet (4) can be provided at any suitable intermediate location between the upper end (2) and the lower end (3) so that the dilute solution travels towards the lower end (3). A reservoir (5) which is suitable for containing dilute solution can be coupled to the inlet (4) for supplying the dilute solution in the freeze concentration column (1).

A refrigerating unit is provided near the lower end (3) of the column (1) for freezing the dilute solution. As can be clearly understood that inlet (4) is to be placed above the refrigerating unit or above area where the freezing of dilute solution takes place.

Referring to FIGS. 1, 2 and 3 a jacketed area (6) can be formed near the lower end of the freeze concentration column (1) for circulating the refrigerant. Any suitable refrigerating unit can be used. The refrigerating unit has evaporator (7), compressor (8), condenser (7) and expansion valve (8). In the refrigerating unit any suitable refrigerant can be used. The dilute solution comes in contact with the wall of the column (1) at the jacketed area (6) and ice deposits on the inner side of the column (1).

A scrapper (9) is provided inside the column (1). The scrapper (9) is placed such that it scraps the ice forming inside the column (1). Scrapping of ice forming in the column generates micro-sized ice particles. Scrapper can be in the form of blades mounted on a shaft (10) which is rotatable with the help of a motor (11). A small gap is provided between the scrapper (9) and ice forming area. The scrapper (9) can be operated continuously or intermittently for scrapping the ice forming in the column (1). The operation of scrapper (9) can be configured in such a way that it does not get jammed in the ice formed inside the column (1).

Ice particles formed in the column (1) has tendency to move upward towards the upper end (2). However, for effective mass transfer slow movement of the ice particles in upward direction is desirable. Therefore, as shown in FIG. 1, a screw type conveyor (12) is provided inside the column which travels through a predetermined length of the column (1). The screw conveyor (12) is driven by a shaft (13) powered by a motor (14).

The design a typical screw conveyor depending on fact that when tiny ice particle gradually moving upward and enter the higher temperature gradient zone, therefore it is important to remove the formed ice from the system with the aid of screw conveyor when the solute concentration less in the ice portion.

A first outlet (15) is provided near the lower end (3) and below the jacketed area (6) for collecting concentrated solution. A first receiver (16) is coupled to the said first outlet (15) for receiving concentrated solution.

A second outlet (17) is provided in the column (1) near the upper end (2) for collecting ice particles. The conveyor (12) can be designed such that it collects the ice particles and transfer them towards the second outlet (16). A second receiver (18) is coupled to the second outlet (16) for receiving the ice, particles. Part of the collected ice particles can be melted and re-supplied in the column (1) through the inlet (4) through a pump (19).

The present invention is described with reference to the figures and specific embodiments; this description is not meant to be construed in a limiting sense. Various alternate embodiments of the invention will become apparent to persons skilled in the art upon reference to the description of the invention. It is therefore contemplated that such alternative embodiments form part of the present invention.

EXAMPLE 1

1% Glucose solution in water fed into the system as explained earlier with an initial volume 200 ml at feed rate 30 ml/hr. The temperature of the column initially maintained at 25° C. Table 1 depicts the as the system operates up to 120 hrs, the concentration of solute increased by 50%—

TABLE 1

| | Liquid portion | |
|---|---|---|
| Time (minutes) | Conc of solute (mg/ml) | Volume (ml) |
| 30 | 10.77 | 135 |
| 60 | 13.998 | 35 |
| 90 | 15.898 | 12 |
| 120 | 19.556 | 10 |

EXAMPLE 2

5% Glucose solution in water fed into the system as explained earlier with an initial volume 400 mL at a feed rate 30 mL/hr. The temperature of the column initially maintained at 25° C. As the process progress, the concentration of sugar in the liquid is increasing almost 59%. Therefore, it is possible to concentrate the liquid in the present invention.

TABLE 2

| | Liquid portion | |
|---|---|---|
| Time (minutes) | Concentration of solute (mg/ml) | Volume (ml) |
| 60 | 51.49 | 350 |
| 120 | 62.87 | 300 |

TABLE 2-continued

| | Liquid portion | |
|---|---|---|
| Time (minutes) | Concentration of solute (mg/ml) | Volume (ml) |
| 180 | 86.85 | 260 |
| 240 | 105.364 | 230 |
| 300 | 115.576 | 215 |
| 360 | 125.975 | 180 |

EXAMPLE 3

5% NaCl solution is feed in to the concentrating column at the feed rate 30 ml/min. The initial temperature of the initial fed was 25° C., as the processes progress, the concentration of NaCl in the liquid is increasing almost 25% within two hours.

TABLE 3

| | Liquid portion | |
|---|---|---|
| Time (min) | Concentration of solute (mg/ml) | Volume (ml) |
| 60 | 52.52 | 316 |
| 120 | 53.35 | 291 |
| 180 | 60.08 | 217 |
| 240 | 70.23 | 137 |

We claim:

1. A process for concentrating dilute solution, said process comprising:
    (a) supplying dilute solution to be concentrated in a vertical freeze concentration column so that dilute solution travels in the downward direction toward a lower end of the freeze concentration column;
    (b) producing localized freezing and micro-size ice particles near the lower end of the freeze concentration column so that the ice particles travel towards an upper end of the freeze concentration column;
    (c) collecting ice particles near the upper end of the freeze concentration column;
    (d) melting ice particles collected in step (c) and subsequently re-circulating part of the liquid to the freeze concentration column so that said liquid travels towards the lower end of the freeze concentration column;
    (e) repeating the steps (a) to (d) for fractionating dissolved solid concentrate and aqueous solution near the upper and lower end of the freeze concentration column respectively till the desired concentration of the dissolved solid is achieved; and
    (f) obtaining the concentrate from the lower end of the freeze concentration column.

2. An apparatus for concentrating dilute solution, said apparatus comprising:
    (a) a freeze concentration column placed vertically having an upper end and a lower end; said freeze concentration column having an inlet for supplying the dilute solution to be concentrated; the inlet is located on the freeze concentration column so that the dilute solution travels in downward direction toward the lower end of the freeze concentration column;
    (b) a refrigerating unit connected to the freeze concentration column so as to generate localized freezing near the lower end of the freeze concentration column;

(c) a means for generating micro-size ice particles placed at the area of localized freezing;

(d) a first receiver coupled to a first outlet of the freeze concentration column for collecting concentrated solution; said first outlet is located near the lower end of the reactor chamber; and (e) a second receiver coupled to a second outlet of the freeze concentration column for collecting the micro-size ice particles; said second outlet is located near the upper end of the freeze concentration column.

3. An apparatus as claimed in claim 2, wherein the means for generating micro-size ice particles is a scrapper or a sperger.

4. An apparatus as claimed in claim 2, wherein the freeze concentration column is provided with a means for facilitating movement of ice particles toward upper end of the freeze concentration column.

5. An apparatus as claimed in claim 4, wherein the means for facilitating movement of ice particles is a screw type conveyor or a perforated screw.

6. An apparatus as claimed in claim 2, wherein the inlet of the freeze concentration column is coupled with the second receiver for supplying part of the liquid from the second receiver to the freeze concentration column.

7. An apparatus as claimed in claim 3, wherein the scrapper comprises blades mounted on a shaft which is rotatable by a motor.

8. An apparatus as claimed in claim 2, wherein the means for generating micro-size ice particles is a scrapper or a sperger, the scrapper comprising blades mounted on a shaft which is rotatable by a motor;

the freeze concentration column is provided with a means for facilitating movement of ice particles toward upper end of the freeze concentration column, said means for facilitating movement of ice particles comprising a screw type conveyer or a perforated screw; and the inlet of the freeze concentration column is coupled with the second receiver for supplying part of the liquid from the second receiver to the freeze concentration column.

* * * * *